US006886817B2

(12) United States Patent
Salice

(10) Patent No.: US 6,886,817 B2
(45) Date of Patent: May 3, 2005

(54) DAMPING DEVICE FOR MOVABLE FURNITURE PARTS

(75) Inventor: Luciano Salice, Carimate (IT)

(73) Assignee: Arutro Salice S.p.A., Novedrate (IT)

( * ) Notice: Subject to any disclaimer, the term of this patent is extended or adjusted under 35 U.S.C. 154(b) by 0 days.

(21) Appl. No.: 10/273,264

(22) Filed: Oct. 17, 2002

(65) Prior Publication Data

US 2003/0089565 A1 May 15, 2003

(30) Foreign Application Priority Data

Oct. 17, 2001 (DE) .................................. 201 17 031 U

(51) Int. Cl.$^7$ .............................................. B60G 11/56
(52) U.S. Cl. .................. 267/34; 188/297; 267/202; 267/216; 267/226; 267/64.26; 267/140.11
(58) Field of Search ............................... 188/297, 316; 267/145, 201, 202, 216, 217, 219, 221, 226, 34, 64.26, 116, 118, 124, 139, 140.11, 140.13

(56) References Cited

U.S. PATENT DOCUMENTS

| | | | | |
|---|---|---|---|---|
| 1,730,646 A | | 10/1929 | Danner | |
| 2,099,240 A | * | 11/1937 | Sproul | 267/4 |
| 2,319,735 A | * | 5/1943 | Hussman | 267/135 |
| 2,640,693 A | * | 6/1953 | Magrum | 267/225 |
| 2,876,979 A | * | 3/1959 | Barbera | 267/140.11 |
| 3,106,387 A | * | 10/1963 | Francis | 267/34 |
| 3,276,763 A | * | 10/1966 | Blatt | 267/116 |
| 3,554,387 A | * | 1/1971 | Thornhill et al. | 213/223 |
| 3,831,529 A | * | 8/1974 | Schwam | 105/198.3 |
| 3,889,934 A | * | 6/1975 | Kamman | 267/34 |
| 4,087,085 A | * | 5/1978 | Hauser | 267/135 |
| 4,304,397 A | * | 12/1981 | Zanow | 267/201 |
| 4,307,794 A | * | 12/1981 | Maciejewski | 188/268 |
| 5,083,756 A | * | 1/1992 | Tobias | 267/136 |
| 5,160,123 A | * | 11/1992 | Danieli | 267/226 |
| 5,197,718 A | * | 3/1993 | Wallis | 267/119 |
| 5,443,146 A | * | 8/1995 | Ayyildiz et al. | 188/374 |

FOREIGN PATENT DOCUMENTS

| | | |
|---|---|---|
| DE | 39310 | 5/1887 |
| DE | 2405143 | 8/1975 |
| DE | 3401427 | 7/1985 |
| DE | 29651527 | * 5/1998 |
| DE | 20107426 | 8/2001 |
| EP | 1006251 | 6/2000 |
| EP | 1076145 | 2/2001 |
| FR | 2267439 | 11/1975 |
| JP | 2001082024 | 3/2001 |

* cited by examiner

Primary Examiner—Robert A. Siconolr
Assistant Examiner—Devon Kramer
(74) Attorney, Agent, or Firm—Dilworth & Barrese LLP

(57) ABSTRACT

A damping device for movable furniture parts, such as doors or drawers, includes a cylinder filled with a free-flowing medium which is compressed by a piston which has a spring applied to it in its extended position. In order to provide a damping device of this type of smaller length, the cylinder includes a telescopic cylinder having at least two stages. A pressure spring is clamped between the bottom of the outer cylinder of the last stage and the piston of the first stage.

21 Claims, 4 Drawing Sheets

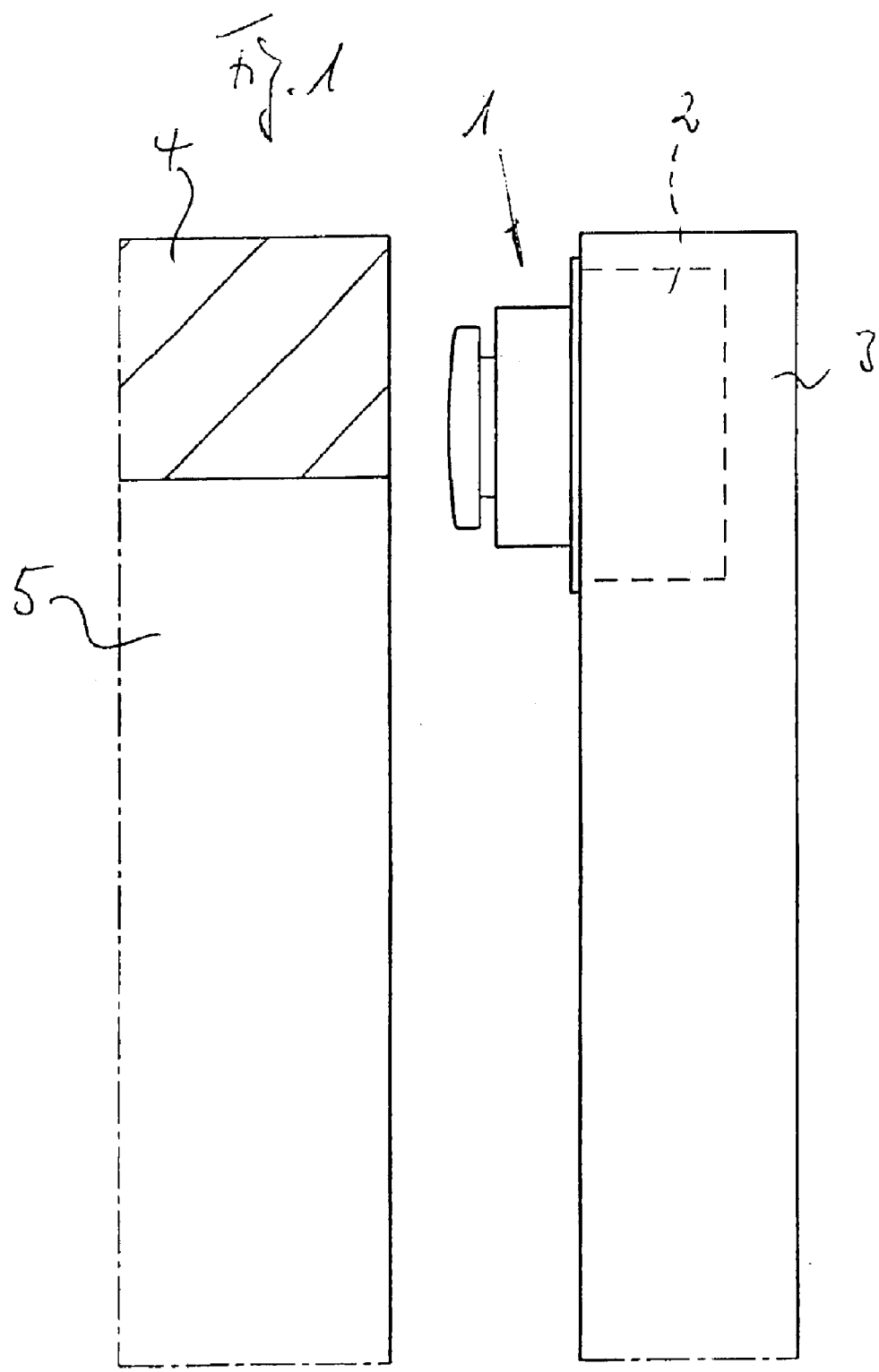

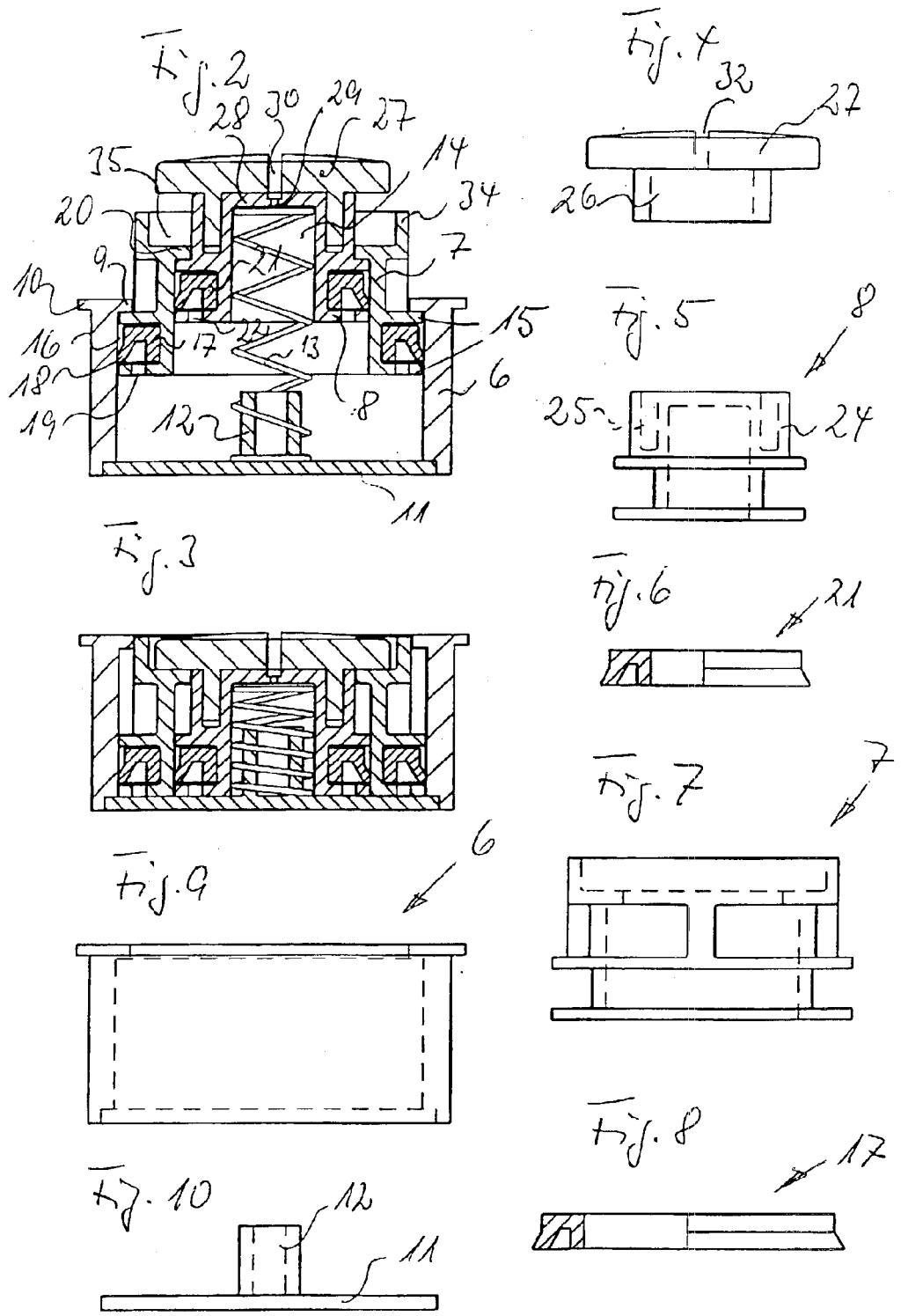

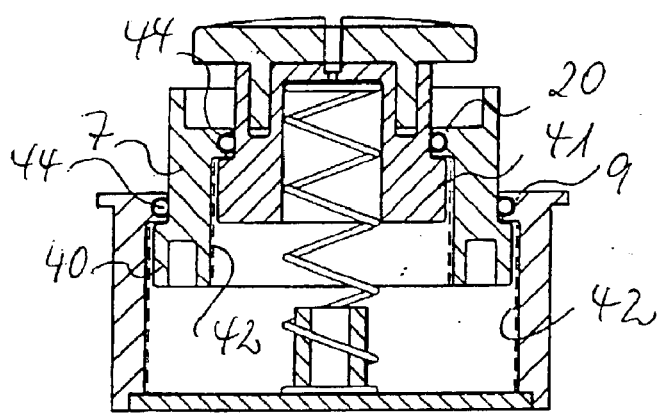
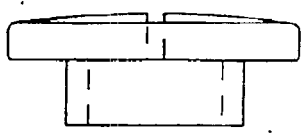
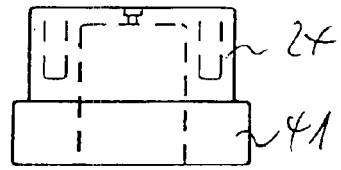
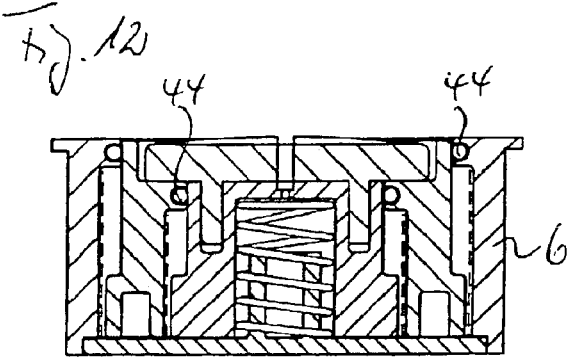
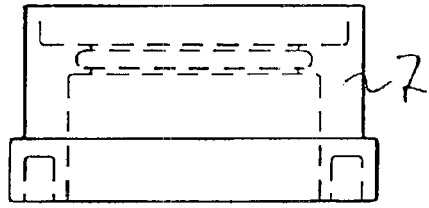
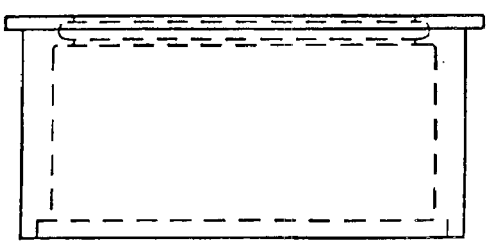

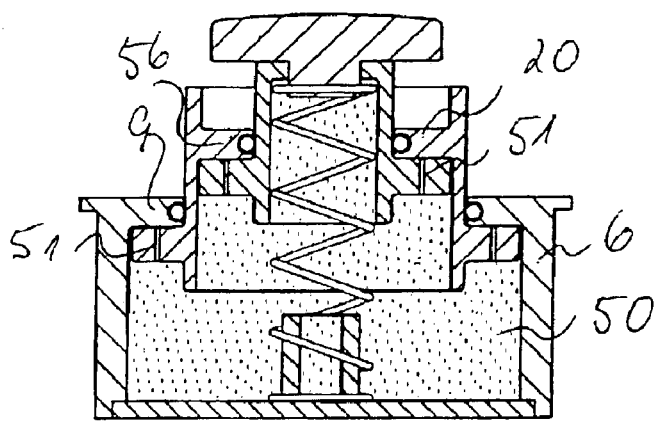
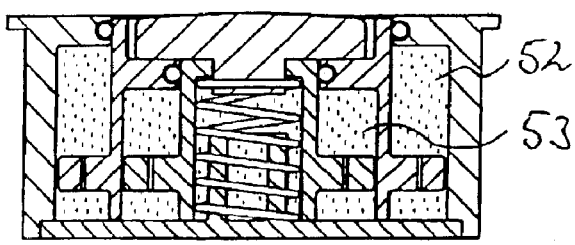
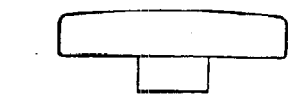
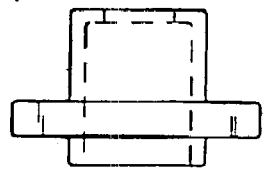
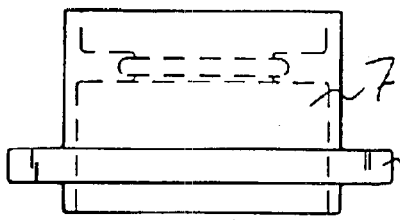
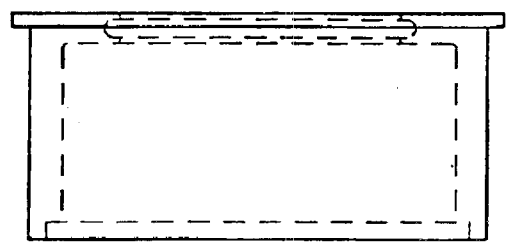

DAMPING DEVICE FOR MOVABLE FURNITURE PARTS

BACKGROUND OF THE INVENTION

The present invention relates to a damping device for movable furniture parts, such as doors or drawers, including a cylinder filled with a free-flowing medium which is compressed by a piston which has a spring applied to it in its extended position.

In a damping device of this type known from European Patent Application 1 006 251 A2, the piston is provided with a piston rod which carries a cap to absorb the impact to be damped. This known damping device has a relatively large overall length, so that in principle it may only be attached to the inside of a wall of a body part of a piece of furniture in order to damp impacts from furniture parts striking against the piece of furniture. However, there is also a need for providing damping devices which may be attached not only to immobile furniture body parts, but also to movable furniture parts, in order to brake these parts during their movement or their stops against fixed furniture parts to prevent harder impacts.

SUMMARY OF THE INVENTION

The object of the present invention is therefore to provide a damping device of the type initially indicated which is distinguished by a small length and/or a small mounting depth, so that it may even be attached to thinner furniture parts, such as boards, doors, or panels of drawers.

According to the present invention, this object is achieved in that the cylinder is telescopic cylinder having at least two stages and a pressure spring is clamped between the bottom of the outer cylinder of the last stage and the piston of the first stage.

Through the implementation according to the present invention, the damping device may be inserted, for example, into a pocket hole bore, as is typical for movable pot-shaped hinge parts, the telescoping parts also able to be pushed into the bore without any protrusion.

In the damping device according to the present invention, the principle of a telescopic cylinder is implemented in such a way that, in the cylinder of the last stage, a cylinder is guided in which a cylinder for the following stage is guided, and so forth up to the cylinder of the first stage, in which the piston of the first stage is guided.

The damping device according to present invention expediently includes a two-stage telescopic cylinder, which therefore only has one single telescoping cylinder, in which the piston is guided, guided in the main cylinder.

A particularly short construction of the damping device according to the present invention may be achieved if the diameter of the cylinder is greater than its length. The piston guided in the telescopic cylinder of the first stage also expediently has a diameter which is greater than its length, including the piston rod.

In a further embodiment of the present invention, the piston and the movable cylinder are each provided with a flanged edge, which, in the extended position of the telescopic cylinder, presses against an annular collar, which is positioned on the outer ends of the main cylinder and the movable cylinder and narrows their diameter. The flanged edges are implemented like annular pistons.

The outer cylinder is expediently terminated by an attached baseplate, so that the damping device may be mounted by first telescoping the piston into the movable cylinder of the first stage and the cylinder(s) of the following stages into one another, so that for final assembly the main cylinder only has to be terminated by the baseplate after insertion of the pressure spring.

The piston of the first stage, or the shaft connected thereto, is expediently provided with a cap which absorbs impacts.

The outer cylinder, the movable cylinder, and the piston are expediently made of injection molded plastic parts or diecast metal parts.

For holding the pressure spring, the baseplate is expediently provided with a pin-shaped projection and the piston with a pocket hole bore.

If the free-flowing medium is air, seals, for example lip seals, are inserted in annular grooves of the flanged edges, the piston of the first stage being provided with an axial ventilation bore. When the piston and the telescopic cylinder of the damping device are compressed, air may escape through this ventilation bore in throttled form, so that the desired damping effect occurs.

The lip seals may have a V-shaped or U-shaped cross-section, the V-shaped or U-shaped grooves formed thereby being connected to the cylindrical chambers through bores in the outer walls of the grooves provided in the flanged edges. Through this design, the grooves of the lip seals have the air pressure in the cylindrical chambers applied to them, so that the outer legs of the grooves, which form the lip seals, press with greater pressure against the walls of the cylinder in which they are guided in correspondence with the increasing internal pressure.

According to a further preferred embodiment, a high viscosity grease is applied to the walls of the cylindrical cavities and the piston of the first stage is provided with an axial ventilation bore. This high-viscosity grease seals the cylindrical chambers and therefore replaces the seals and/or lip seals of the previously described embodiment.

Annular seals which press against the shaft of the piston and the outside of the movable cylinder to form a seal are expediently inserted in annular grooves of the collars.

If the free-flowing medium is oil, annular seals are inserted in the annular grooves of the collars which seal off the annular chambers between the flanged edges and collars, the flanged edges being provided with throttle bores. In this embodiment as well, annular seals, which press against the shaft of the piston and the outside of the movable cylinder to form a seal, are inserted in annular grooves of the collars.

BRIEF DESCRIPTION OF THE DRAWINGS

Exemplary embodiments of the present invention are described in more detail in the following with reference to the drawing.

FIG. 1 shows a top or side wall of a cabinet, against which a door or a front panel of a drawer presses in the closed position, using the damping device according to the present invention, FIG. 2 shows a section through a first embodiment of the damping device according to the present invention in its extended position, FIG. 3 shows the damping device according to FIG. 2 in its position compressed into the main cylinder, FIGS. 4 to 10 show individual parts of the damping device shown in FIGS. 2 and 3, FIGS. 11 & 12 show an illustration corresponding to FIGS. 2 and 3 of a second embodiment of the damping device according to the present invention, FIGS. 13 to 17 show individual parts of the damping device according to FIGS. 11 and 12, FIGS. 18 & 19 show an illustration corresponding to FIG. 2 in 3 of a third embodiment of the damping device according to the present invention, and FIGS. 20 to 24 show individual parts of the damping device according to FIGS. 18 and 19.

DESCRIPTION OF THE PREFERRED EMBODIMENTS

A damping device 1 according to the present invention, which is inserted into a pocket hole bore 2 of a door, lid, or drawer panel 3, is shown in FIG. 1 in a position in which it is located just before striking against the face of a wall 4 of a cabinet body or the like.

A first embodiment of the damping device according to the present invention is shown in FIGS. 2 to 10. It includes a main cylinder 6, in which a telescopic cylinder 7 is movably guided, piston 8 being movably guided in this cylinder.

Main cylinder 6 includes a cylindrical tubular section whose diameter is greater than its length. On its upper edge, the main cylinder is provided with an annular collar 9 projecting inward and a peripheral flange 10, using which supports itself on the edge of the bore or pocket hole bore into which it is insertable. Flange 10 may be provided with ear-shaped projections which have bores to receive fastening screws.

On its lower end, main cylinder 6 has an annular step into which a baseplate 11 is inserted, which may be connected to the main cylinder through ultrasound welding, for example, if these parts are made of plastic. Baseplate 11 has a central hollow pin 12, which is used as the holder of the lower end of a pressure spring 13, whose upper end is held in a pocket hole 14 of piston 8.

Movable cylinder 7 is guided in cylinder 6. This movable cylinder has a flanged edge 15 on its lower end which is provided with a peripheral annular groove 16, into which an annular lip seal 17 is inserted. This lip seal 17 has a V-shaped cross-section, the outer leg 18 of the groove formed in this way pressing against the inner wall of main cylinder 6 to form a seal. The lower wall delimiting groove 16 is provided with bores 19 which discharge into the V-shaped groove of lip seal 17, so that the pressure of the cylindrical chambers obtains in this groove and seal lip 18 presses against the wall of cylinder 6.

Movable cylinder 7 is provided on its upper end with an annular collar 20, which delimits its diameter, and against which piston 8 presses in the extended state. Piston 8 is provided in a way corresponding to movable cylinder 7 with an annular groove, into which a sealing ring 21 is inserted, whose V-shaped groove is connected to the cylindrical chamber by a bore 22. Piston 8 is supported by a shaft-shaped part 24, into whose face an annular groove 25 is introduced, which is used to receive and hold tubular holding part 26 of cap 27. Top wall 28 of piston 8, which delimits pocket hole recess 14, is provided with a central bore 29, which is aligned with a bore 30 of cap 27 and forms a throttle bore for the air escaping from the cylindrical chamber when the damping device is compressed. Bore 30 discharges into slots 32 of cap 27 so that the escape of the air is not impaired in the event of impact against the face of a wall of a furniture part.

Movable cylinder part 7 has a flanged edge on its upper end, which supports a cylindrical ring 34, so that an annular receiving chamber 35 is formed, into which cap 27 may dip when the damping device is compressed.

As may be seen in FIG. 3, in the compressed state of the damping device, both piston 8, including cap 27, and movable cylinder 7 dip completely into main cylinder 6, so that the damping device may be positioned, in a pocket hole bore of the movable furniture part whose movement is to be damped, in such a way that, in the compressed state, no parts project over the surface of the furniture part into which the damping device is positioned countersunk.

The embodiment shown in FIGS. 11 to 16 differs from that shown in FIGS. 2 to 8 in that flanged edge 40 of movable cylinder 7 and piston 41 are sealed in relation to the cylindrical walls in the main cylinder and the movable cylinder by having a high-viscosity grease 42 applied to them, instead of by lip seals.

Furthermore, annular grooves are provided in annular collars 9 and 20 of main cylinder 6 and movable cylinder 7, which project inward, into which sealing rings 44 are inserted, which press against the outsides of movable cylinder 7 and the shaft part of piston 41 to form a seal.

The embodiment shown in FIGS. 18 to 24 differs from the two preceding in that the liquid medium to be compressed is oil 50. Oil 50 located in the cylindrical chambers is compressed through throttle bores 51, which are introduced into a flanged edge 55, which forms an annular piston, and the edge of piston 57, into annular chambers 52, 53, one of which is formed between flanged edge 55 of movable cylinder 7 and collar 9 of main cylinder 6, which projects inward, and the other of which is formed between piston 57 and collar 20 of movable cylinder 7, which projects inward.

These annular chambers 52, 53 are sealed to the outside by sealing rings 44, which are inserted into annular grooves of flanged edges 9, 20 in the way previously described.

What is claimed is:

1. A damping device (1) for movable furniture parts (3), comprising a cylinder filled with a free-flowing medium which is compressed by a piston (8) which has a spring (13) applied to it forcing it into its extended position, characterized in that the cylinder is a telescopic cylinder (6, 7, 8) having at least two stages including a main outer cylinder (6), a first movable cylinder (7) movably guided in the main outer cylinder (6), and the piston (8) movably guided in the first movable cylinder (7) with respect thereto, the spring (13), which is a pressure spring, is clamped between a bottom (11) of the main outer cylinder (6) of a last stage and the piston (8) of a first stage, and p1 the first movable cylinder (7) is movably guided with respect to the main outer cylinder (6), and the piston (8) is movably guided with respect to both the main outer cylinder (6) and the first movable cylinder (7).

2. The damping device according to claim 1, characterize in that the diameter of the cylinders (6, 7) is greater than their length.

3. The damping device according to claim 1, characterized in that the diameter of the piston (8) is greater than its length, including a piston rod (24) therein.

4. The damping device according to claim 1, characterized in that the piston (8) and first movable cylinder (7) are each provided with a flanged edge, each of which, in the extended position of the telescopic cylinder, press against annular collars (9, 20), provided on outer ends of the main outer cylinder (6) and the first movable cylinder (7) and narrowing their diameters.

5. The damping device according to claim 1, characterized in that the main outer cylinder (6) is terminated by an attached baseplate (11).

6. The damping device according to claim 5, characterized in that, to hold the pressure spring (13), the baseplate (11) is provided with a pin-shaped projection (12) and the piston (8) is provided with a pocket hole bore (14).

7. The damping device according to claim 1, characterized in that the piston (8) of the first stage, or a shaft (24) attached thereto, is provided with a cap (27) which absorbs impacts.

8. The damping device according to claim 1, characterized in that the main outer cylinder (6), the first movable cylinder (7), and the piston (8) are made of injection molded plastic parts or diecast metal parts.

9. The damping device according to claim 1, characterized in that the free-flowing medium is air, a high-viscosity grease (42) is applied to the walls of the cylinders, and the piston of the first stage is provided with an axial ventilation bore.

10. The damping device according to claim 9, characterized in that annular seals (44), which press against a shaft (24) of the piston (41) and an outside of the first movable cylinder (7) to form a seal, are inserted into annular grooves of collars.

11. The damping device according to claim 1, characterized in that the free-flowing medium is oil (50), annular seals, which seal annular chambers (52, 53) between the piston and flanged edges and collars, are inserted into annular grooves of the collars, and the flanged edges are provided with throttle bores (51).

12. The damping device according to claim 1, characterized in that the main outer cylinder (6), first movable cylinder (7) and piston (8) are telescopically arranged with respect to one another with the diameter of said main outer cylinder (6) larger than diameter of said first movable cylinder (7) and diameter of said first movable cylinder (7) larger than diameter of said piston (8).

13. The damping device according to claim 12, characterized in that the piston (8) and the first movable cylinder (7) are each provided with a flanged edge, each of which, in the extended position of the telescopic cylinder, press against annular collars (9, 20), provided on the outer ends of the main outer cylinder (6) and the first movable cylinder (7) and narrowing their diameters.

14. The damping device according to claim 12, characterized in that said spring (13) is fixedly mounted to said main outer cylinder (6) at one end thereof, and, at an opposite end thereof, positioned within a pocket hole recess (14) of said piston (8).

15. The damping device according to claim 14, characterized in that the piston (8) and the first movable cylinder (7) are each provided with a flanged edge, each of which, in the extended position of the telescopic cylinder, press against annular collars (9, 20), provided on the outer ends of the main outer cylinder (6) and the first movable cylinder (7) and narrowing their diameters.

16. The damping device according to claim 15, wherein a top wall (28) of said piston (8) delimits the pocket hole recess (14) and is provided with a central bore (30) to form a throttle for air escaping during compression.

17. The damping device according to claim 15, characterized in that said main outer cylinder comprises a base plate (11) having an inner central hollow pin (12) upon which said spring (13) is fixedly mounted at said one end thereof.

18. The damping device according to claim 1, characterized in that the movable furniture parts (3) are doors or drawers.

19. A damping device for movable furniture parts (3), comprising a cylinder filled with free-flowing medium which is compressed by a piston (8) which has a spring (13) applied to it forcing it into its extended position, characterized in that the cylinder is a telescopic cylinder (6, 7, 8) having at least two states including a main outer cylinder (6), a first movable cylinder (7) movable guided in the main outer cylinder (6), and the piston (8) movably guided in the first movable cylinder (7) with respect thereto, the spring (13), which is a pressure spring, is clamped between a bottom (11) of the main outer cylinder (6) of a last stage and the piston (8) of a first stage.

the piston (8) and first movable cylinder (7) are each provided with a flanged edge, each of which, in the extended position of the telescopic cylinder, press against annular collars (9, 20), provided on outer ends of the main outer cylinder (6) and the first movable cylinder (7) and narrowing their diameters, and the free-flowing medium is air, seals are inserted into annular grooves of the flanged edges, and the piston (8) of the first stage is provided with an axial ventilation bore (29, 30).

20. The damping device according to claim 19, characterized in that the seals are lip seals (17, 21).

21. The damping device according to claim 20, characterized in that the lip seals (17, 21) have a V-shaped or U-shaped cross-section and the V-shaped or U-shaped grooves of the lip seals formed in this way are connected to chambers within the cylinders by bores (19, 22) in external walls of grooves provided in the flanged edges.

* * * * *